Patented Dec. 18, 1951

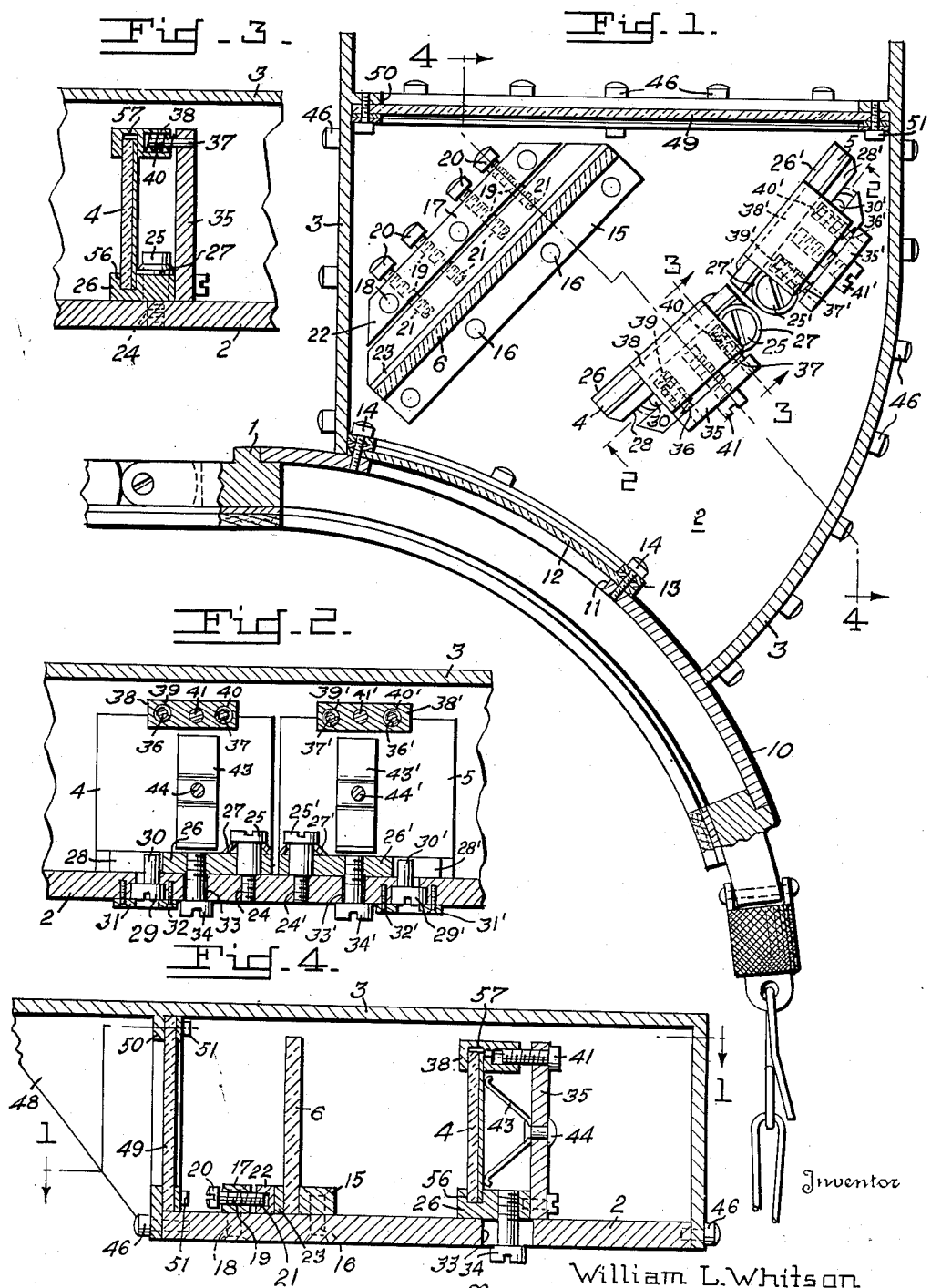

2,578,768

UNITED STATES PATENT OFFICE 2,578,768

MIRROR MOUNTING FOR OPTICAL INSTRUMENTS AND FINE ANGULAR ADJUSTMENT MEANS THEREFOR

William L. Whitson, Oak Ridge, Tenn., assignor to the United States of America as represented by the Secretary of War Original application August 18, 1945, Serial No. 611,435, now Patent No. 2,486,453, dated November 1, 1949. Divided and this application April 4, 1949, Serial No. 85,402

1 Claim. (Cl. 88—96)

(Granted under the act of March 3, 1883, as amended April 30, 1928; 370 O. G. 757)

The invention described herein may be manufactured and used by or for the Government for governmental purposes, without the payment to me of any royalty thereon.

This application is a division of my copending application, Serial Number 611,435, filed August 18, 1945 for Stadia Range Finder now Patent 2,486,453, granted November 1, 1949.

It is the principal object of the invention to provide a mounting for a mirror which is operable to give a very fine angular adjustment thereof about two mutually normal axes both lying in or parallel with the plane of the mirror.

A further object is the provision of a mirror mounting operable to secure the mirror in fixed position of adjustment.

Other objects and advantages will be apparent after a study of the following description in connection with the drawing wherein Fig. 1 is a sectional view of the invention as applied to a pair of goggles for wear upon the head of an observer, as indicated by the line 1—1 of Fig. 4.

Fig. 2 is a detail sectional view showing the pivotal mounting and adjustment means for adjusting a pair of contiguous mirrors about one of the aforesaid axes and taken upon the line 2—2, Fig. 1.

Fig. 3 is a section taken in a plane indicated by the line 3—3, Fig. 1, and showing the means for holding a mirror in adjusted position about the other of the aforesaid axes and Fig. 4 is a section taken as indicated by the line 4—4, Fig. 1, and showing the mechanism by which a mirror is adjusted about the other axis referred to in the description of Fig. 3.

Although the mirrors and their mountings, forming the subject matter of this invention are shown in connection with a stadia type range finder, it will be understood that the mirrors and their mountings are of general utility where a fine positive angular adjustment is desired or required.

Thus, numeral 1, Fig. 1, identifies one of the interpivoted eye sections of a pair of goggles provided with a conventional head band, not shown. The transparent pane usually supplied with section 1 is replaced by a correspondingly shaped frame 10 having a sight opening 11 over which a protective sheet of glass or transparent plastic 12 is secured by a rim or frame 13 and screws 14, in a manner evident from inspection of Fig. 1.

A base plate 2 is rigidly attached to and carried by frame 10 and, as shown, is substantially parallel to but offset from, a line of sight through opening 11. A partially silvered or aluminized mirror 6 is releasably fixed in vertical position upon base 2 by being clamped between a backing strip 15 riveted to plate 2 at 16 and a second strip 17 also riveted to plate 2 at 18 in spaced parallel relation with strip 15. Set screws 20 are threaded through strip 17 as clearly indicated at Figs. 1 and 4 and, when turned down, act to rigidly clamp reflector 6 in upright position on base 2.

Two plane total reflectors or mirrors 26 and 26' are shown. Since these mirrors and their mountings are reverse duplicates, a description of one will suffice. Corresponding parts of the other mirror and its mounting are identified by the same numerals, primed, as have been used to identify like parts in the one now described.

A base block 26 is pivoted upon screw 25 threaded into base 2 and is urged into contact with the base by a spring washer 27. Block 26 has a slot 28 extending radially of the axis of pin 25. An adjusting element 29 has a head rotatable in a hole in base 2 and an accentric shank 30 extending into slot 28 so that the block may be given a fine adjustment about screw 29 in a manner obvious from inspection of Figures 1 and 2. A washer 31 is secured to base 2 to prevent element 29 from dropping out. Plate 2 has arcuate slot 33 concentric of screw 25. A screw 34 passes through this slot and is threaded into a tapped hole in block 26 to thereby secure the block in adjusted position with respect to base 2. It will be noted that, as adjustment and clamping of block 26 are effected from a lower surface of plate 2 access to the interior of the instrument is unnecessary for this purpose.

An upstanding bracket or backing plate 35 is fixed to block 26 at its rear edge. At its top this bracket carries the pair of spaced pins 36 and 37 which are loosely received in respective bores in an upper block 38 as shown in Figures 1 and 3. Coil springs 39 and 40, Fig. 2, surround the pins 36 and 37 to thereby urge block 38 away from bracket 35. Such movement, however, is prevented by a screw 41 which extends loosely through a hole in bracket 35 between pins 36 and 37 and engages in a tapped hole in block 38. Lower and upper blocks 26 and 38 have parallel confronting grooves 56 and 57 respectively as shown in Figure 4, to receive the opposite edges of mirror 4. Any play or looseness of the mirror 4 in these grooves is taken up by a leaf spring 43 attached to bracket 35 by a rivet 44 and having its ends positioned to exert pressure against the mirror. Thus, by turning the screw 41, mirror 4 can be adjusted about an axis substantially coincident with its lower edge, to a position exactly perpendicular to plate 2. By loosening the screw 34 and turning element 39 the angular position of mirror 4 upon base 2 can be varied.

It will be noted from Figure 1 that the two pivoted screws 25 and 25' are located in closely adjacent positions so that the mirrors carried by the two brackets can be adjusted to make any desired small angles with respect to mirror 6.

Figures 2, 3 and 4 show a cover 3 adapted to fit over and about base plate 2 to inclose and protect the optical parts. As will be seen from Figure 4 this cover is held to base 2 by screws 46. The forward part of casing 3 has an opening 50 in alignment with opening 11 and is covered by a transparent pane 49 secured in position by screws 51.

In this manner each of the mirrors 26 and 26' is mounted for precise adjustment upon base 2 about two mutually normal axes one of which is perpendicular to base 2 and the other of which is parallel to said base. Both axes are parallel to the plane of the corresponding mirror. Adjustment is effected easily and rapidly and, once made, is secured by screws 34 and 34' and springs 43 and 43'.

While I have shown a preferred form of mirror mounting it will be obvious to those skilled in the art after a study of the foregoing specification that various modifications and alterations are possible without affecting the basic principle upon which the device operates. It is therefore my desire to reserve all such modifications as fall in the scope of the subjoined claim.

Having now fully disclosed the invention, what I claim and desire to secure by Letters Patent is:

In a mounting for a plane reflector for an optical instrument, a base, a bracket having a pivot hole, a first slot radial of said hole and a second arcuate slot concentric of said hole, a pivot pin fitting said hole and secured to said base to pivotally mount said bracket about a first axis normal to said base, a head journaled in said base and having an eccentric shank fitting said first slot to adjust said bracket about said first axis, a set screw passing through said arcuate slot and threaded into said bracket to clamp said bracket in adjusted position on said base, said bracket having an upstanding extension and an upwardly-facing channel generally parallel with said base, an upper block having a channel, means mounting said upper block on said extension and operable to adjust the same toward and from said extension, a plane mirror having its opposite edges received in said channels respectively, said mounting means being operable to adjust said mirror about second axis generally coincident with its lower edge and normal to said first axis.

WILLIAM L. WHITSON.

REFERENCES CITED

The following references are of record in the file of this patent:

UNITED STATES PATENTS

| Number | Name | Date |
|---|---|---|
| 745,110 | Lallie | Nov. 24, 1903 |
| 1,118,193 | Ferber | Nov. 24, 1914 |
| 2,220,945 | Naecker | Nov. 12, 1940 |
| 2,224,579 | Wheelan | Dec. 10, 1940 |
| 2,476,426 | McLeod | July 19, 1949 |

FOREIGN PATENTS

| Number | Country | Date |
|---|---|---|
| 13,562 | Great Britain | June 12, 1907 |